INVENTORS
HOWARD A. ZOLLINGER
THOMAS A. KEENAN

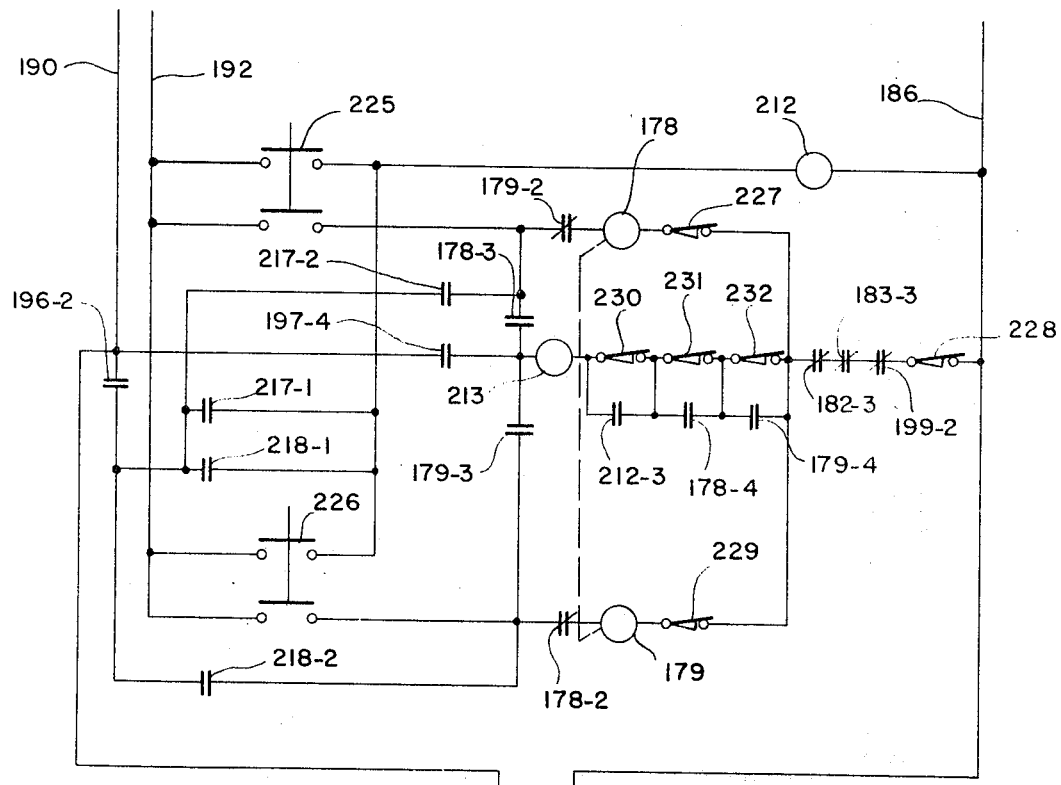
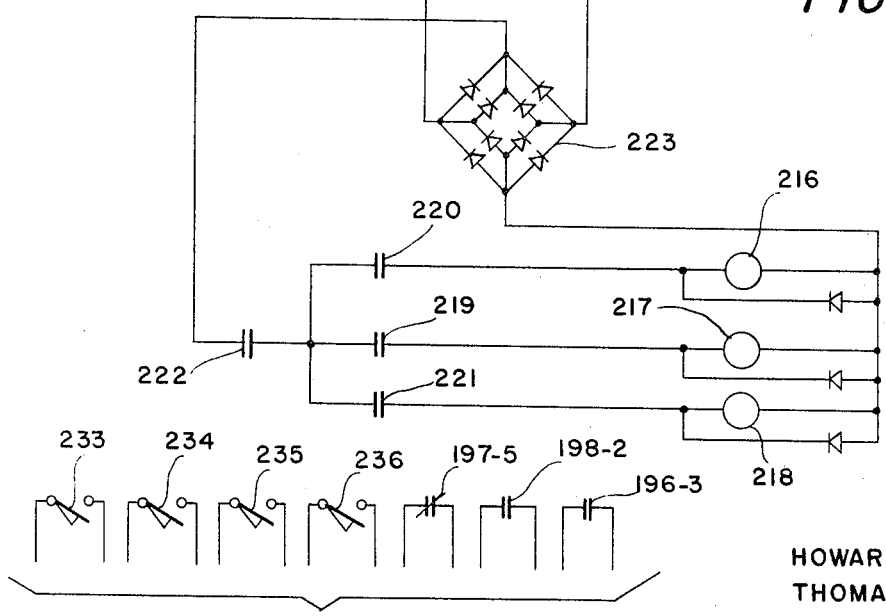
FIG. 8

INVENTORS
HOWARD A. ZOLLINGER
THOMAS A. KEENAN

United States Patent Office 3,519,150
Patented July 7, 1970

3,519,150
STORAGE SYSTEM WITH MEANS FOR TRANSFERRING A VEHICLE BETWEEN A PLURALITY OF PATHS THAT HAVE CONTROL MEANS THEREIN
Thomas A. Keenan and Howard A. Zollinger, Buffalo, N.Y., assignors to Westinghouse Electric Corporation, Pittsburgh, Pa., a corporation of Pennsylvania
Filed Apr. 5, 1968, Ser. No. 719,172
Int. Cl. B65g 1/00
U.S. Cl. 214—16.4                                     19 Claims

ABSTRACT OF THE DISCLOSURE

A system is shown for automatically transferring a cable controlled first vehicle from any one to another of a plurality of paths of operation by means of a transfer vehicle that carries the first vehicle along a transfer course extending from the transfer end of a path to the transfer end of another of the paths. There is a control cable for each path, and a connector at one end of each cable is detachably connectable to a terminal arrangement on the first vehicle. The other end of each cable is connected to a remote control station. When connected to any of the cables, the first vehicle is controlled by information transmitted through the cable. A command via the cable from the control station initiates the automatic transfer which involves a break of the first vehicle from the cable in one path, and connection to the cable of another path after the first vehicle is transferred to the other path.

BACKGROUND OF THE INVENTION

In automated warehousing, high-rise vertical storage racks are frequently serviced by stacker cranes operatin in long runways or aisles formed between parellel stands of storage racks. Each crane is controlled from a central remote location and command signals for operation of the crane are applied to the crane control circuits by means of a control cable that is festooned or carried in a cable reel permanently attached to the crane.

Instead of having a stacker crane in each aisle, it is more economical to service a plurality of aisles with a single crane. This may be effected by providing a transfer trolley hung and travelling on rails extending along a course that intersects each aisle at one end. By transferring the crane from one aisle to the trolley, and then moving the trolley to the next aisle, where the series of the crane are necessary, and transferring the crane to this aisle, a single crane may be used for the several aisles.

In such a system, it is desirable to be able to effect transfer of a stacker crane from one aisle to another in a completely automatic manner without disrupting the automatic mode of operation of the control station so that the crane may be capable of performing several uninterrupted command operations at various aisle locations.

A particular problem is posed in the type of system wherein the crane is controlled by an extendible control cable connecting the crane with a control center such as a computer, and it is desired to transfer the crane between aisles automatically without manual intervention and in such manner that the computer has control of the crane when in any aisle.

SUMMARY OF THE INVENTION

In accordance with the present invention, there is provided a system for automatically transferring a remotely controlled cable connected vehicle from one to another of a plurality of paths of operations without disrupting the automatic mode of the control station. A transfer vehicle is disposed to carry the first named vehicle, after the cable is disconnected, along a transfer course extending from the transfer end of one aisle to the transfer end of another aisle.

In accordance with one embidement of the invention, position of the first vehicle at the transfer point, in a condition ready for transfer, is established through operation of selected microswitches; however, transfer of the first vehicle to the transfer or second vehicle cannot be effected until completion of an optical circuit between the two vehicles. Once the first vehicle is transferred onto the second vehicle, the second vehicle is driven to a computer selected path of operation.

Transfer of the crane to this path cannot be effected until the second vehicle is appropriately centered at the computer selected path of operation, upon which time a solenoid on the second vehicle is activated and trips a microswitch carried on the first vehicle to cause energization of the first vehicle drive circuits.

Each aisle includes a separate control cable which is connected at one end to the centrally located remote control panel or station which may be, for example, a general purpose computer. The other end of the cable is terminated with a connector carried on an overhead rail. This connector may be the female part of a male-female disconnect mechanism and is detachably connected to the male mating connector part carried on the first vehicle.

Command signals from the remote control station to effect transfer of the first vehicle from one selected path of operation to another are carried by the control cable and upon receipt of a transfer command signal, the following automatic actions are initiated:

(a) The transfer vehicle, if not already at the transfer end of the path of operation, is moved into position at the transfer end of the path containing the first vehicle;

(b) The connector part secured to the first vehicle is disengaged from the connector part secured to the control cable;

(c) The first vehicle is transferred onto the transfer vehicle;

(d) The transfer vehicle is driven along the transfer course into alignment with the transfer end of the selected path to which the first vehicle is to be transferred;

(e) The first vehicle is transferred off the transfer vehicle and into the selected path; and (f) The terminal arrangement of the connector part on the first vehicle engages the terminal arrangement of the connector part on the end of the control cable as the male and female parts are driven together, thus reestablishing control of the first vehicle from the remote location.

A principal object of the present invention is to provide an improved system for automatically transferring a remotely controlled, cable connected vehicle from any one to another of a plurality of paths of operation.

Another object of the present invention is to provide disconnect apparatus for making and breaking electrical connections to a remotely controlled, cable connected vehicle.

A further object of the present invention is to provide an improved automated warehousing system having a stacker crane for automatically servicing a plurality of aisles controlled from a remote location with means to disconnect and connect the crane from its control cable located in each aisle without disrupting the automatic mode of operation of the system.

Other objects of the present invention will be apparent from the following brief description of one embodiment of the invention as applied to an automated warehousing system having a stacker crane servicing a plurality of parallel high-rise storage racks spaced apart to provide aisles or paths of operation therebetween. An extendable control cable is provided in each aisle and one end of each cable is terminated at a remotely located central control source from which command signals are derived. The other end of each cable is terminated with a connector carried in the aisle on an overhead rail and adapted to be detachably connected to a mating connector on the crane. The central control source, when connected to the stacker crane through any one of the cables, monitors and controls various operating elements of the crane by means of information flow through the cable.

Transfer of the stacker crane from one aisle to another is effected via a transfer trolley which travels normal to one end of the parallel aisles. To this end, the cable connector is disconnected from the vehicle connector and the free end of the cable is locked in position at the transfer end of an aisle. Thus, each aisle has a locked cable ready to receive a mating vehicle connector as the crane is transferred to the selected aisle. Upon transfer of the crane from the trolley to the aisle, the crane is again placed under full control of the control source and at no time is the automatic mode of the control source interrupted.

Further objects and advantages of the invention will become apparent from the following detailed description thereof taken in connection with the accompanying drawings wherein like characters represent like parts throughout several views. It should be noted that parts of the drawings are shown in diagrammatic, block and symbolic forms.

BRIEF DESCRIPTION OF THE DRAWINGS

FIGS. 6, 7 and 8 are across-the-line diagrams of the A.C. and D.C. control circuits for the transfer trolley.

DESCRIPTION OF THE PREFERRED EMBODIMENTS

Figure 1:
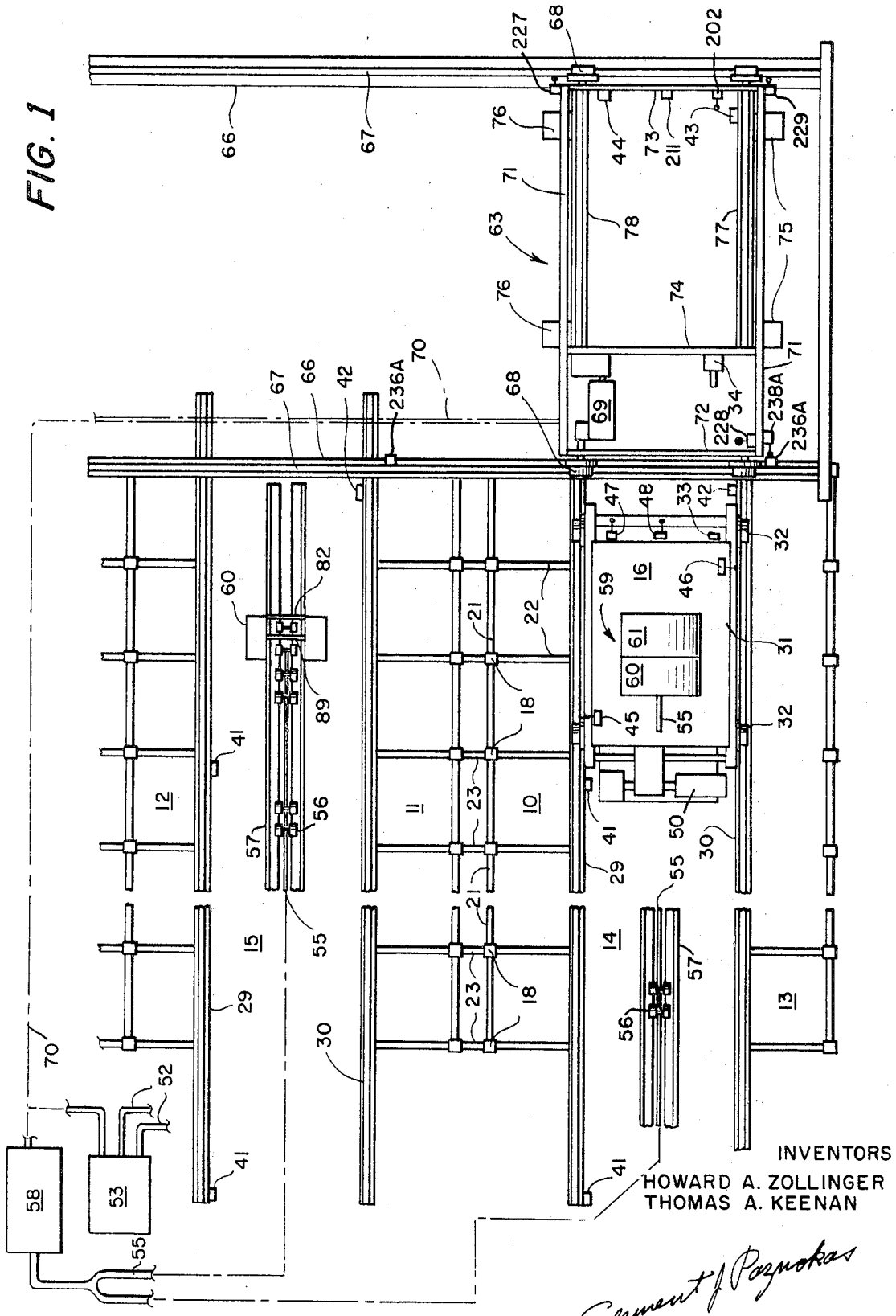
FIG. 1 is a fragmentary, plan view of the present invention as applied to an automated warehousing system having a stacker crane servicing a plurality of parallel high-rise storage racks.
Figure 2:
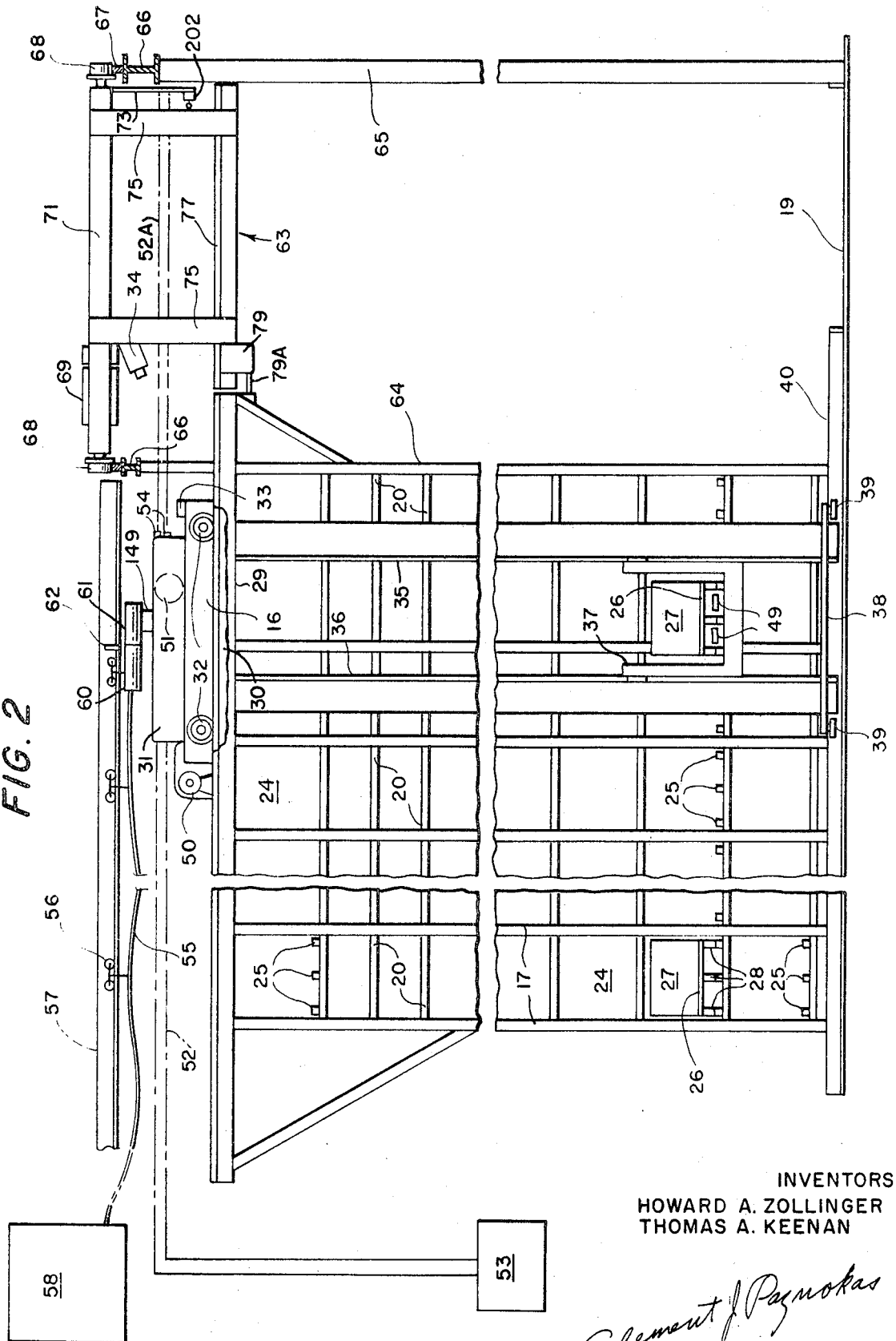
FIG. 2 is a fragmentary elevational view of the automated warehousing system shown in FIG. 1, particularly illustrating the path of travel of the transfer trolley normal to one end of the parallel aisles.

Referring now to the drawings, and in particular to FIGS. 1 and 2, there is shown, in part, a warehousing arrangement having a plurality of high-rise storage racks, only four of which 10, 11, 12 and 13 are shown. Each rack has an open article-receiving end arranged in facing relationship to an aisle 14 or 15 above which rides a stacker crane 16. Racks 10–13 are similar in construction and include vertical columns 17 and 18 supported on a suitable base member on floor 19. "Open work" storage cubicles or spaces are formed by horizontal front bars 20 and back bars 21 connecting pairs of columns 17 and 18, respectively, and horizontal frame members 22 connecting the front and back columns 17 and 18 at various levels. The back ends of adjacent racks are connected to each other by frame members 23 to increase rigidity of the units.

Since all racks are formed in a substantially identical manner, it is apparent that the frame work provides a lattice-type structure having a plurality of storage cubicles disposed along $x$ and $y$ coordinates. Thus a reference point may be arbitrarily established at the lowermost cubicles in the forwardmost rack and a location designation is assigned to this cubicle corresponding to the $x$ and $y$ coordinate system. Thereafter, each cubicle has a fixed position with respect to the reference point or first cubicle and the position of each cubicle or bin may be programmed into the control computer. For example, if X11, Y01 designates the first rack, first cubicle at the first level; then X33, Y11 would designate the third rack, third cubicle at the 11th level, etc. It should be apparent, however, that the latter choice of designation is merely an illustrative example and may be varied from installation to installation in accordance with the programming schedule being utilized in the computer controlling the operation of the warehousing system.

Each cubicle 24 is similar in construction and includes spaced horizontal rails 25 extending normal to the adjacent aisle from the front to the back of the cubicle. The ends of the rails 25 are disposed on and fixed to the front and the back horizontal bars 20 and 21. For simplicity, only a few cubicles have been illustrated as having rails, but it should be apparent that these rails are provided in each cubicle. Rails 25 are adapted to support a load pallet 26 on which loads 27 are conveniently stored and carried about.

Load pallet 26 includes spaced rail members 28 which, like rails 25, are spaced sufficiently to accommodate the lift forks of a crane or of a warehouse fork truck. Advantageous, the spacing of rails 25 corresponds exactly to that of rails 28 so that when a load pallet is inserted into a cubicle, rails 28 rest on rails 25 providing additional vertical clearing space to accommodate extendable forks 49 provided on crane 16.

Positioned above aisle 14 and secured to the uppermost portion of the racks are spaced rail members 29 and 30. Similar rail members are provided in each aisle for transporting the overhead crane 16 between the loading end of the aisles beneath the cantilevered portion of the rails and the transfer end at the rear.

Crane 16 may be moved in either direction along an aisle by car 31 carried by motor driven wheels 32 disposed on aisle rails 29 and 30. Depending from car 31 are two masts 35 and 36 for supporting and guiding a hoisting cage 37. Fixed to lower ends of masts 35 and 36 is a framework 38 carrying four guide wheels 39 (only two visible).

Two of the guide wheels engage a guide strip 40 provided on one side of an aisle while the other two engage a corresponding guide strip on the other side of the aisle. It should be apparent that each aisle is similarly constructed so that the crane operates in each aisle in a similar manner.

To this end, disposed along the aisle and on the trolley 63 are a plurality of cam actuators 41, 42, 43 and 44 adapted to contact an actuating arm of a microswitch positioned on the crane when the crane is moved beyond a designated position. Cam 41 at the forward end of each aisle is an overtravel limit actuator for switch 45. Cam 42 is a transfer position actuator for switch 46 and maintains a pair of contacts of switch 46 open when the crane is in the transfer position. Switch 46 may also be actuated by cam 43 on the trolley which prevents overtravel. Cam 44 on the trolley is positioned to actuate switch 47 on the crane in the crane memory relay circuits. Also positioned on crane 16 is a solenoid operated microswitch 48 and photodetector 33 which cooperates with a light source 34 on the trolley to control transfer of the crane to and from an aisle.

It should be understood that the microswitches called for herein function as position responsive switches which operate from one to another mode in response to a vehicle arriving at or leaving a predetermined position and vice versa. Wherever a microswitch is called for herein, any suitable switching arrangement may be employed which will operate in response to predetermined position of a vehicle to open or close circuits as desired. For example, photoelectric and magnetic proximity switching schemes may be utilized instead of the cam operated switches shown. It should be further understood that the representations of the various microswitches and actuating cams shown in FIGS. 1 and 2 and their placement relative to other structures are diagrammatic in nature, and that suitable supports and fastenings therefor are not necessarily shown.

It should be apparent that each switch may include one or more sets of contacts which may be normally biased in an open or a closed position. Accordingly, reference should be made to the circuit diagrams and the description related thereto which set out the function and manner of operation of the switches. It should also be apparent that other switches and cam control elements may be provided such as, for example, in the crane hoist circuit and that in the interest of simplicity and brevity the details thereof have not been shown.

Crane car 31 carries a suitable reversible motor drive 50 coupled to wheels 32 to provide forward or reverse locomotion. Car 31 also carries a reversible hoist motor drive 51 operatively linked with hoist cage 37, which itself is provided with a motor drive (not shown) for extending the load forks 49 into the storage cubicles on either side of an aisle, as desired, and for retracting them into a neutral position. Suitable control circuits are provided on the crane 16 for controlling the various drives in operation of the crane. Power for the control circuits of the crane 16 may be supplied from trolley wires or power cable 52 through conventional current collectors on the crane which engage the trolley wires connected to power source 53 by the car 31. Each aisle is provided with trolley wires 52 which may be supported in any conventional manner, but at a height which assures engagement of the current collectors 54 with the conductors.

Figure 3:
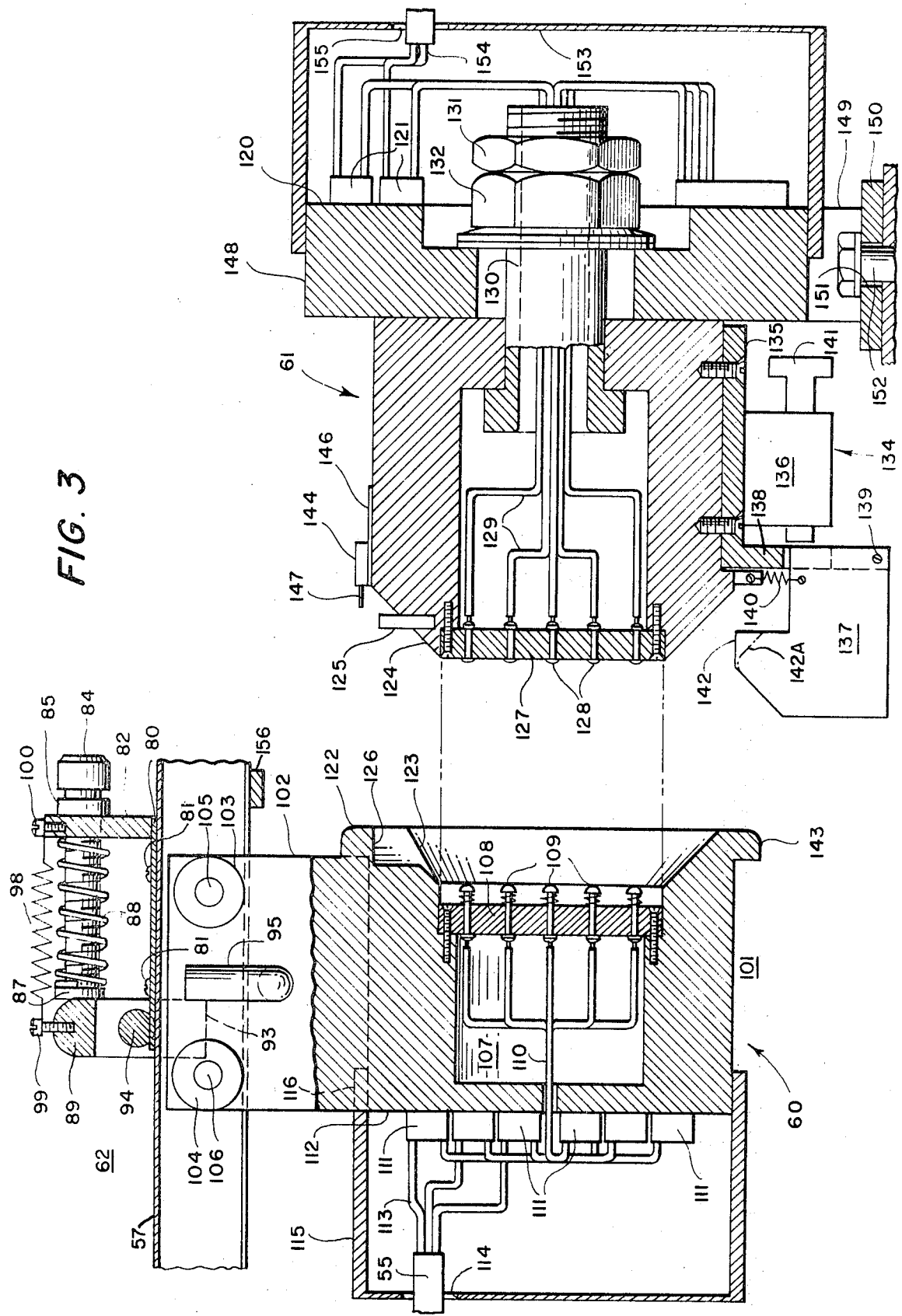
FIG. 3 is a fragmentary view, partially in cross-section, of the disconnect device of the present invention with the crane carried connector part separated from the free end of the control cable.
Figure 4:
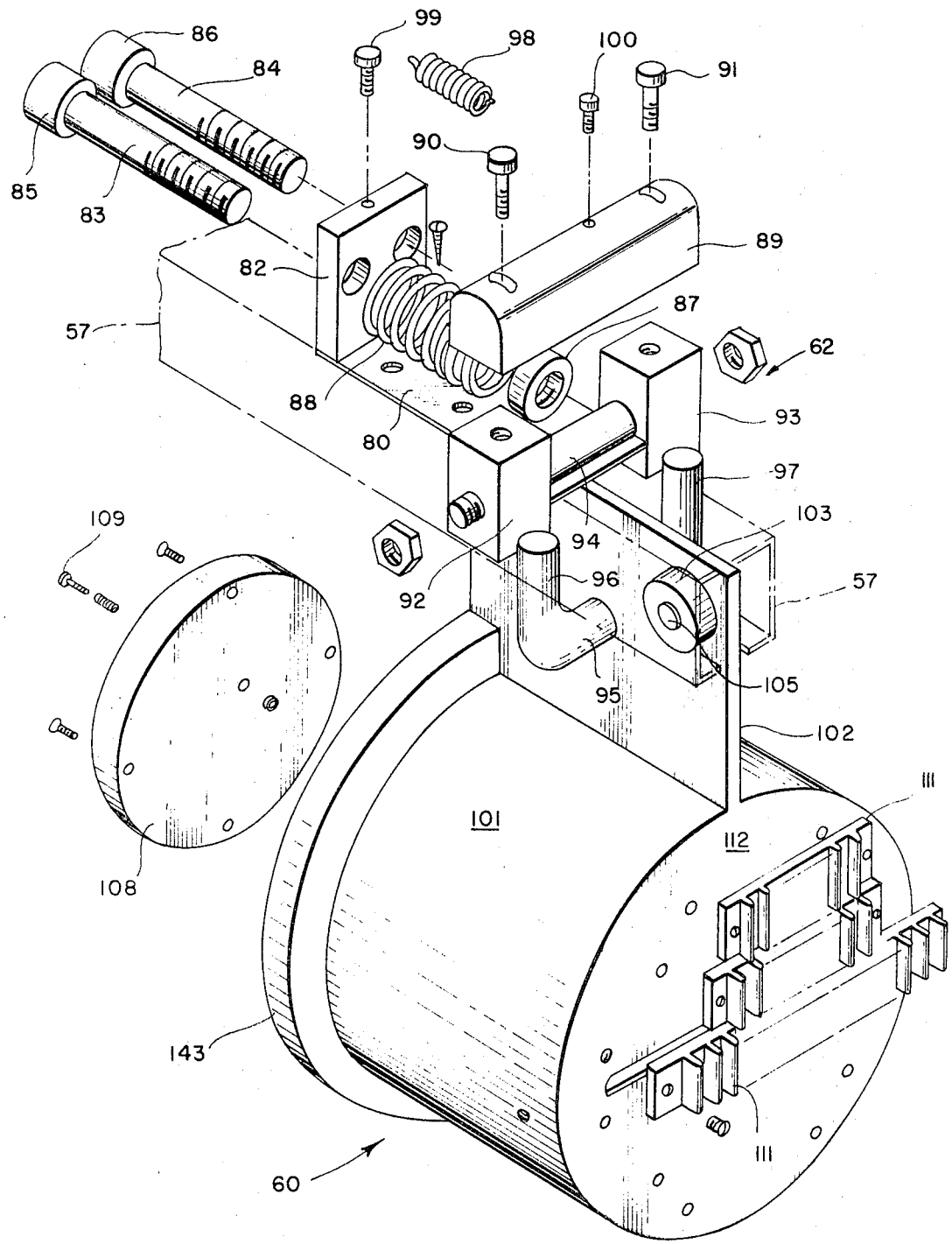
FIG. 4 is an exploded view of the female connector portion of the disconnect mechanism.
Figure 5:
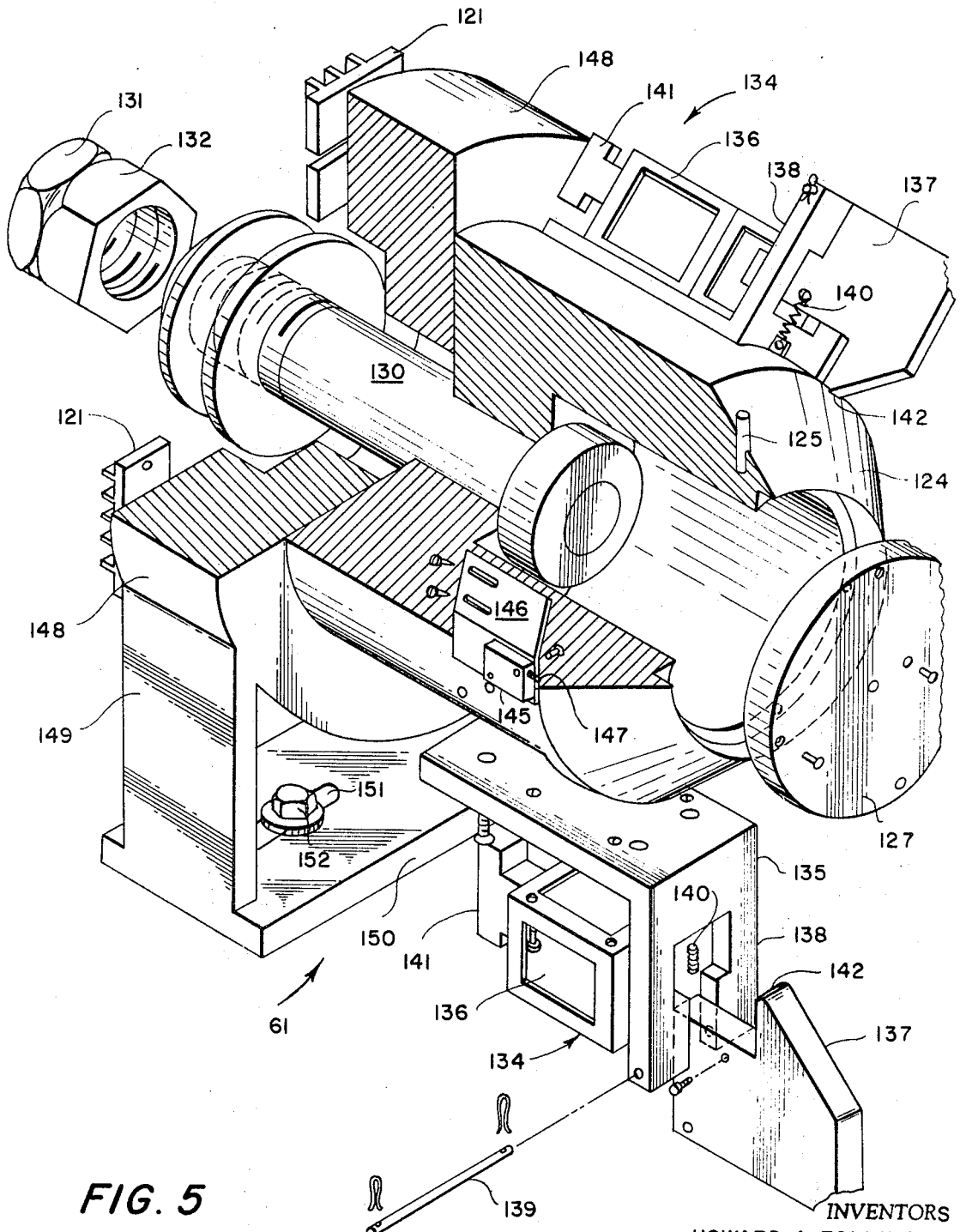
FIG. 5 is an exploded view, partially in cross-section of the male connector portion of the disconnect mechanism.

In addition to the trolley wires, each aisle is provided with multi-conductor control cable 55 which is festooned along the aisle by carriers or rollers 56 riding on rail 57 which may be supported by an overhead structure. One end of each control cable 55 is connected to a remotely located control source 58 which may be, for example, a computer. The other end of the cable is detachably connected to a disconnect mechanism 59 comprising two connector parts one of which 61 is rigidly secured to crane 16 while the other of which 60 is connected to the end of the control cable. At the crane transfer position in each aisle, a lock mechanism 62 is secured to overhead rail 57 and operates to lock cable connector 60 of the free end of control cable 55 in position so that connection to mating part 61 may be readily established when the crane is transferred from the transfer trolley 63 to an aisle. The details of the connector parts 60 and 61 and lock mechanism 62 are best illustrated in FIGS. 3-5; however, before proceeding to a description of these elements, the structure of the trolley transfer system will be described.

The trolley transfer system includes spaced vertical columns 64, 65, atop of which are supported conventional I beams 66, each of which supports a rail 67. Rails 67 extend normal to the aisles formed by the storage racks and establishes a transfer course or transfer path along which crane 16 is carried by transfer trolley 63. Trolley 63 is of the motorized type and is driven along rails 67 by wheels 68 coupled to a variable speed motor drive assembly 69. Power to the motor drive assembly and transfer trolley circuits and electrical connections from the trolley circuits to the control station are provided through current carrying conductors in cable 70. Thus cable 70 includes conductors connected with the computer 58 and conductors connected with a power source for example source 53. Cable 70 may be festooned below trolley 63 in a manner similar to cable 55.

A pair of spaced frame members 71 are joined at corresponding opposite ends by transverse members 72 and 73 and at an intermediate portion by motor drive support 74. Frame members 71 each support a pair of depending columns 75 and 76 which have secured thereto at their lower ends spaced rails 77 and 78. Rails 77 and 78 are adapted to be aligned with rails 29 and 30 of an aisle with a minimum clearance therebetween at their junction point to permit smooth transfer of the crane from an aisle onto the transfer trolley. Likewise power trolley lines 52A on the transfer vehicle 63 are alignable with the trolley lines 52 with a minimum gap to allow the trolley collectors on the crane 31 to bridge the gap for power continuity as the crane moves onto the trolley. To this end, an electrical stop is provided which includes latch motors 79, one on each side of the trolley 63 each arranged upon energization to drive a pin 79A or screw type latch into a hole (not shown) in the rack adjacent a transfer point.

Referring to FIGS. 1 and 2, power source 53 and control source 58 have been illustrated in block diagram form as located on floor 19 beyond outermost rail 29. It should be apparent, however, that this location has been chosen as a matter of convenience for illustration of the invention and that the sources can be positioned in any convenient remote location. Further, it should be apparent that although control cable 70 is shown as including the conductors which carry the power current and the control or command current, it may be desirable to isolate power circuits in which case separate cables or a trolley wire and collector system would be provided.

The details of the quick disconnect mechanism 59 are shown most clearly in FIGS. 3-5 to which reference should now be made. Lock mechanism 62 is rigidly secured at a corresponding position in each aisle on overhead rail 57 to ensure that the free end of each control cable is locked at the same point. The exact distance from the end of the aisle at which lock mechanism 62 is mounted is, of course, dependent on the mounting position of connector part 61 on crane 16. It may be noted that details of rail 57, connector sections 60 and 61, and the lock mechanism 62, shown in FIGS. 3, 4 and 5 are either not shown or are shown only in diagrammatic or symbolic form in FIGS. 1 and 2 for clarity of illustration.

As most clearly shown in FIG. 3, lock mechanism 62 includes base plate 80 mounted on rail 57 by screws 81. Stand 82 secured to base plate 80 extends upwardly therefrom and is provided with a pair of bores through which are slidingly received screws 83 and 84. Screws 83 and 84 are also slidingly received in sleeves 85 and 86 and have threaded at each of their ends a nut 87 to permit adjustment of the compression force of helical springs 88.

Each spring 88 is mounted about the shaft of the corresponding cap screw 83 or 84. One end of each spring bears against stand 82 and the other end bears against one side of nut 87. The other side of nut 87 is provided with a smooth face which bears against one side of transverse connector 89 secured by screws 90 and 91 to stop bars 92 and 93. Stop bars 92 and 93 are pivotally supported on axle 94 which is secured to the base plate 80.

Cooperatively associated with stop bars 92 and 93 for effecting pivotal movement thereof about the axle and locking the disconnect 59 in place is a lock bar 95. Lock bar 95 is U-shaped and is secured to the body of the connector assembly 60 with the arms of the bar identified by characters 96 and 97 straddling rail 57 so that one arm contacts each stop bar 92 and 93.

Referring to FIG. 3, control cable 55 is shown in its locked position at a transfer point. The pulling force exerted by the weight of cable 55 causes arms 96 and 97 to bear against stop bars 92 and 93; however, the force is insufficient to overcome the opposing forces on connector 89 from springs 88. In operation, assuming the crane is approaching a transfer position, lock bar 95 approaches stop bars 92 and 93 from the left side, as viewed in the drawing, and upon contact causes the stop bars to pivot counter-clockwise about the axle 94 against the biasing force of returning spring 98 fastened between stand 82 and connector 89 by screws 99 and 100. At this point, the connector parts are firmly held together by a latching mechanism, so that spring 98 may be considerably smaller than compression springs 88 which have to prevent movement of the cable until connection is established and the latching mechanism is latched.

When the crane is being transferred from the trolley to an aisle, springs 88 resist clockwise movement of the stop bars 92, 93 about axle 94 upon inital contact of parts 60, 61 permitting the mating connector parts to be joined together with a strong latching force. Continued movement of the crane overcomes the holding force of the helical springs 88 forcing stop bars 92 and 93 to pivot clockwise to clear lock bar 95 beyond the stop bars and permit free movement of the festooned control cable 55.

The detachable connector of the disconnect 59 comprises a female socket 60 adapted to receive a male plug or jack 61. Socket 60 includes a main body section 101 to which is secured or formed integral therewith a hangar or arm 102. In addition to lock bar 95, arm 102 supports a pair of rollers 103, 104 mounted to axles 105, 106, respectively. The interior of body section 101 has a central bore 107 within which is mounted an insulative disc 108. Disc 108 has mounted thereto a plurality of spring biased contacts 109. Contacts 109 are connected by conductors 110 to terminal strips 111 mounted to the rear surface 112 of housing or body section 101. Terminal strips 111 serve as terminating points for conductors 113 of control cable 55. Cable 55 passes through a suitable opening 114 in the rear of housing cover 115 and is supported by conventional cable bushing (not shown) which protects the cable insulation from damage. Cover 115 is advantageously slotted at 116 to permit the cover to be slid past the edge of hanger 102 and detachably secured to the main body 101 in any suitable manner.

Bore 107 of body section 101 terminates at a point which is recessed from the front face 122 and from there outward the bore has a gradually increasing diameter forming an internal frusto conical surface of revolution 123. This frusto conical bore is adapted to abut a complementary shaped surface 124 of plug or male connector 61. An alignment pin 125, is disposed in the tapered surface 124 and is adapted to be received in channel 126 cut into surface 123 to ensure proper alignment of the mated parts.

Male connector 61 has secured thereto at its front end an insulated disc 127, similar in shape to disc 108. Disc 127 supports a plurality of fixed electrical contacts 128 which are connected through conductors 129 to terminal boards 121 mounted to rear surface 120. Conductors 129 pass to the exterior of connector 61 by means of a hollow shaft 130 supported by main body portion 61 by nuts 131 and 132 threaded against rear surface 120.

Spaced about the exterior of body 61 are one or more latching (locking) members 134 adapted to hold or lock the mated parts together in contact making relationship and to prevent disengagement of the parts while crane 16 is operating in an aisle to distribute materials. Preferably, three latching members are provided, spaced 120° from each other, about the periphery of the body; however, other arrangements may also be utilized.

Each latch member 134 includes a base support 135 on which is mounted a solenoid 136. Each latch member further includes a trip bar 137 pivoted between the ends of a bifurcated right angle extension 138 of base support 135 on a dowel or pin 139. Pin 139 extends across the channel formed by the arms of extension 138 to freely support the trip bar which is normally biased in a locked position by spring 140. Movement of the trip bar 137 for unlatching is effected upon actuation of the armature 141 by energization of solenoid 136 which causes the trip bar to swing in a counter-clockwise direction thereby clearing the tip 142 from engagement with lip or flange 143 on connector 60.

Also supported on the outer surface of body 61 are a pair of microswitches 144, 145 mounted on brackets 146. Each microswitch includes a normally open pair of contacts and a normally closed pair of contacts and an operating arm 147. Operating arm 147 extends beyond surface 124 and is adapted to engage the front face 122 of connector 60 so as to be actuated and reverse the microswitch contacts when the two connector parts have been mated.

Male connector 61 includes a backplate 148 having a pair of spaced legs 149 joined by a transverse base plate 150. Base plate 150 is slotted at 151 to receive bolts 152 for mounting the unit to the frame structure of crane 16. Cover 153 which encloses the rear of backplate 148 is conveniently slotted on opposite sides to allow the cover to clear the leg supports 149. Connections from terminal boards 121 are brought out by conductors 154 which pass through an opening 155 in the rear of cover 153.

Latching member 134 has been described as being of the solenoid actuator type; however, other forms of latching arrangements may be provided. For example, the solenoid may be eliminated and the latching operation made completely mechanical. This may be done by rounding the corner or tip 142 of trip bar 137 to provide cam action in both directions as indicated by dashed line 142A. The trip member may then be caused to break away from latch surface or lip 143 by exerting a sufficient pull on the male connector 61 after member 60 engages a mechanical stop 156 fixed to rail 57 across the path of the leading edge of hangar 102. It has been found that the rounded corner provides a locking engagement up to a pulling force of about 200 lbs., while at the same time requiring a latching force of about 50 lbs. to effect proper mating of the connector parts. In the above arrangement, in addition to the latch 137, magnets may be employed to hold members 60 and 61 in mated engagement.

Other alternative arrangements may be provided. For example, connector parts 60 and 61 may be secured or locked together through magnetic attraction by an electromagnet arrangement energized when the connector parts are mated or through the use of permanent magnets. Also, other suitable arrangements, for example electromagnets or a solenoid latch arrangement may be utilized to lock the connector 60 to rail 57 in lieu of the illustrated lock mechanism 62.

Figure 6:
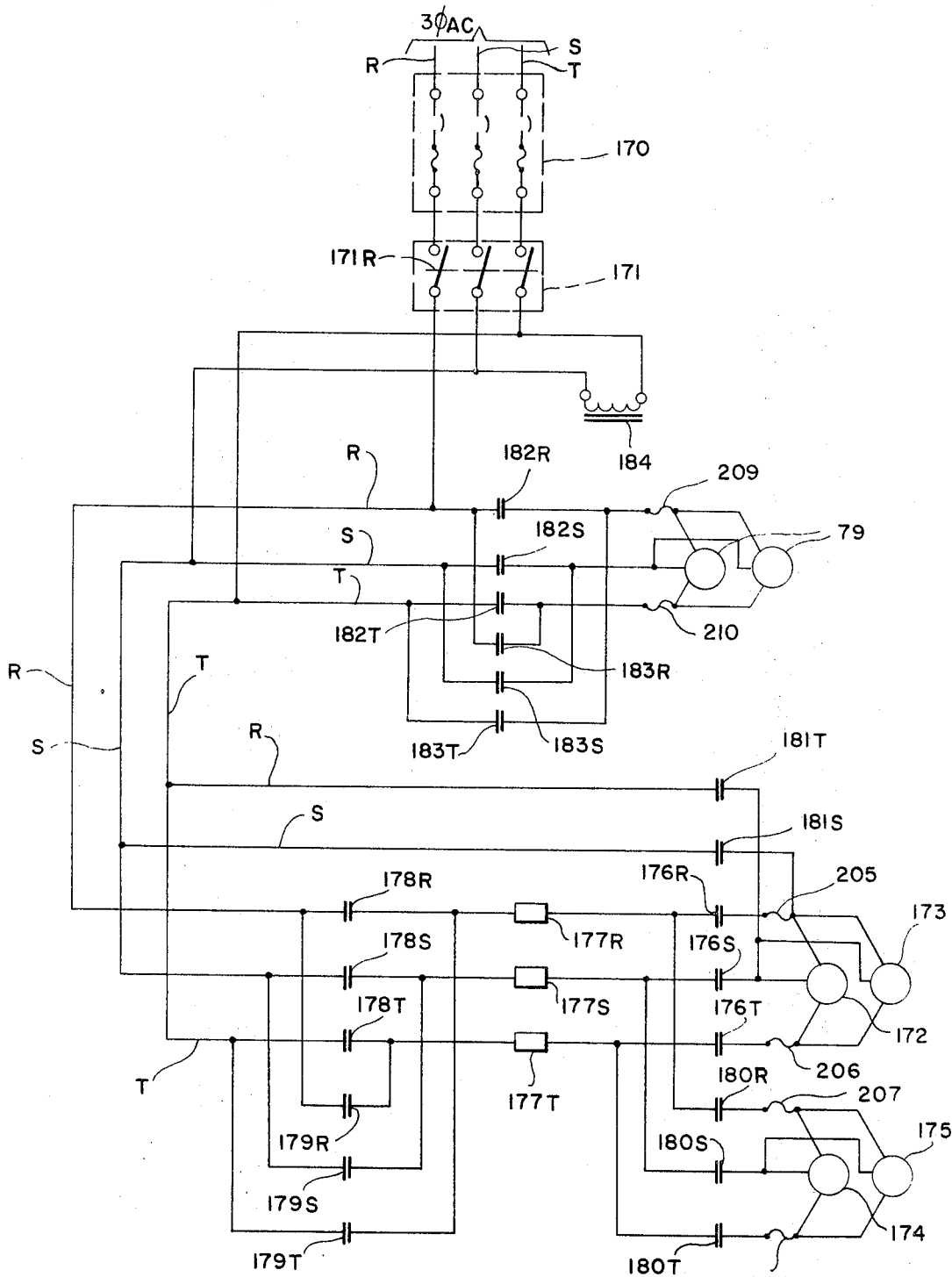
Figure 7:
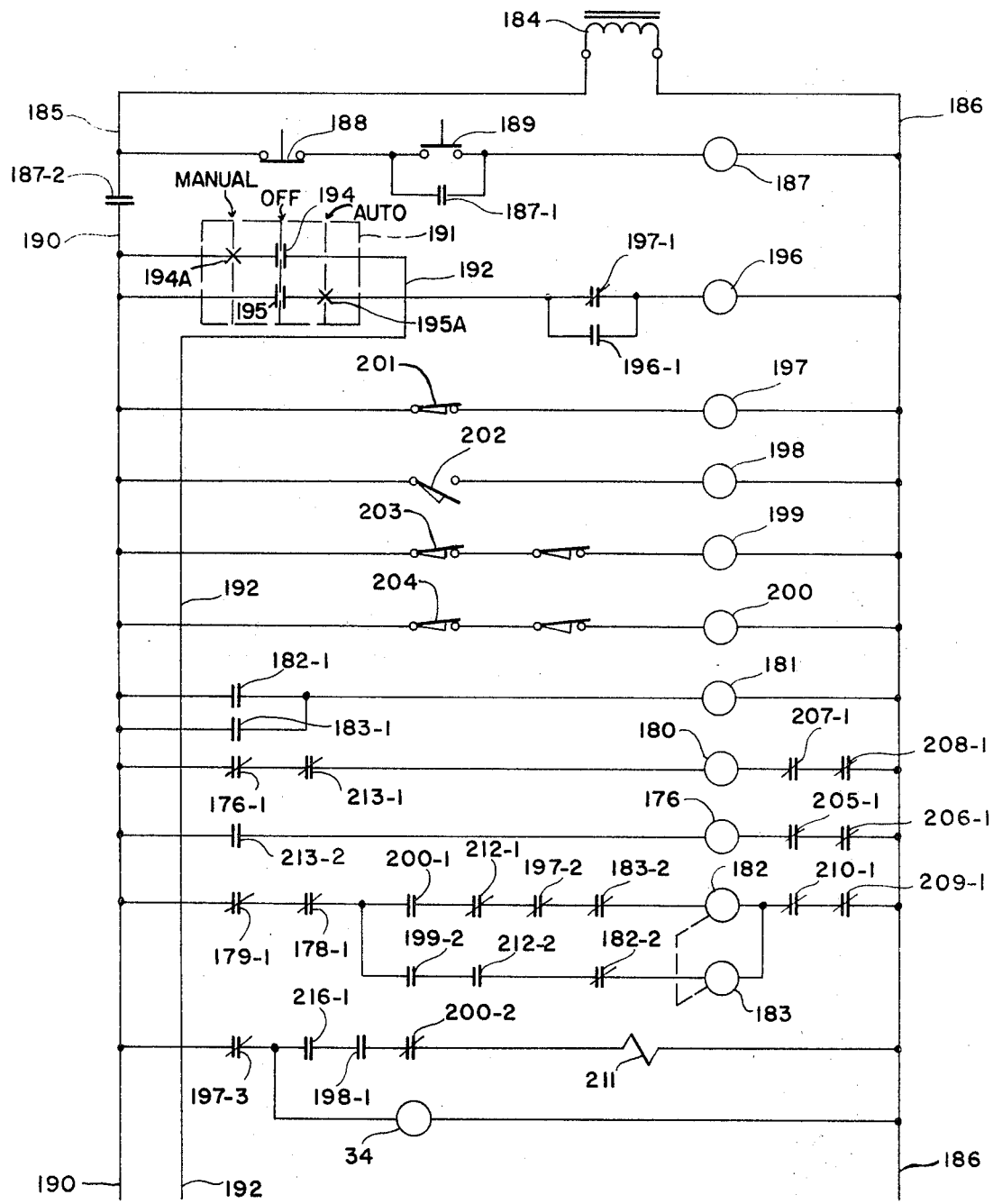

Referring now to FIGS. 6, 7 and 8 there is illustrated the AC power and motor circuits for the transfer trolley. For convenience, the contact sets of a relay or switch are designated with the same numerical character as the associated operating relay or switch, but an additional letter or numerical character designation is given to identify a specific contact set. For example 171R refers to the R contact set of switch 171.

Three phase power is applied across lines R, S and T through a conventional line circuit breaker 170 and line disconnect switch 171, both of which may be disposed at the remote control station. Trolley moter drive 69 comprises a set of high speed transfer travel motors 172, 173 and a set of low speed travel motors 174, 175 adapted to inch the trolley into its final position. Each of the motors may be selectively driven in a reverse or a forward direction.

To this end, high speed motors 172, 173 are adapted to have their excitation windings connected to the input power lines R, S and T through contacts 176R, 176S and 176T of high speed relay 176 (FIG. 7), current limiting resistors 177R, 177S and 177T and the contacts of either the forward travel relay 178 (FIG. 8) or reverse travel relay 179. Energization of forward travel relay 178 connects the power lines to the excitation windings or motors 172, 173 in an R, S, T sequence, while energization of relay 179 reverses the sequence of excitation. Low speed drive of the trolley is effected upon energization of low speed relay 180 (FIG. 7) which connects motors 174, 175 across the power lines through contacts 180R, 180S and 180T. Braking of motors 172, 173 is effected upon energization of transfer brake relay 181 (FIG. 7) which closes contacts 181S and 181T to reverse the excitation across the motor windings connected to the R and S power line conductors.

As hereinbefore described, to prevent misalignment of the rails due to trolley movement when a crane is being transferred in one or the other direction, a motor driven latch 79 is provided. Latch motors 79 (FIG. 6) are driven in a forward direction upon energization of forward latch relay 182 (FIG. 7) to drive the latch pins 79A into position in holes in the rack. The latch pin is retracted upon reverse energization of motors 79 which occurs upon closure of contacts 183R, 183S and 183T (FIG. 6) of reverse latching relay 183 (FIG. 7).

AC power to the transfer trolley control circuits is taken from lines S and T to which the primary winding (FIG. 6) of control transformer 184 is connected. The secondary winding of transformer 184, shown in FIG. 7, is connected to lines 185 and 186. Master relay 187 is adapted to be connected across lines 185, 186 upon closure of switches 188 and 189. Switch 188 is a normally closed emergency stop switch. Switch 189 is a normally open, manually operable switch of spring return type which, upon closure, connects relay 187 across hot lines 185 and 186. Energization of relay 187 closes its contacts 187-1 and 187-2 to bypass switch 189 and apply power to control line 190. Line 190 is also connected to the circuit transfer relay 178 and 179 through the operator's selector switching arrangement 191 and power line 192 to enable selective manual control of the crane.

To this end, selector switching arrangement 191 has three selectable control positions, MANUAL-OFF-AUTOMATIC, and is provided with two sets of contacts, 194 and 195. The illustrated symbolic convention for selector 191 is interpreted as follows. The selector is shown in the OFF position in which neither of the contacts 194 and 195 are closed. The X mark 194A to the left of contacts 194 and on the MANUAL reference line indicates that when the selector 191 is operated to the MANUAL position, contacts 194 will be closed to connect line 190 to line 192. In like manner, the X mark 195A to the right of contact 195 and on the AUTOMATIC reference line indicates that when selector 191 is operated to the AUTOMATIC position, contacts 195 will be closed to connect the automatic relay 196 across the hot lines 186 and 190 through the normally closed contacts 197-1 of aisle center relay 197. Energization of relay 196 closes the holding contacts 196-1 across relay contacts 197-1 to lock the automatic relay 196 in.

The aisle center relay 197, together with crane-on-transfer relay 198, latch out relay 199 and latch in relay 200 are respectively energized through microswitches 201, 202, 203 and 204 positioned on the trolley and actuated through corresponding cam actuators (not shown). Cam actuators are positioned at each aisle 14 and 15 to actuate microswitch 201 and thereby aisle-center relay 197 when the transfer trolley 63 is at the center of the aisle. When the crane is nested in the trolley, the crane cams switch 202 closed to energize crane-on-trolley 198. Microswitches 204 and 203, not shown in FIGS. 1 and 2, are switches which respond to full in or full out position, as the case may be, of latch pins 79. Brake relay 181 may be serially connected through contacts 182-1 or 183-1 to hot line 190 to release the brake mechanism on motors 172, 173, 174 and 175 as hereinbefore described.

Overload protection for the high speed motor circuit is provided through relays 205 and 206 which have their contacts connected in series with relay 176 to open the circuit to 176 in case of an overload. A similar arrangement is provided for the slow speed motor circuit through relays 207 and 208 which open the circuit to the low speed relay 180 in case of overload. Latch motors 79 are protected from overloads through relays 209 and 210 which have their contacts connected in series with the latching relays 182 and 183.

Relay 176 can only be energized upon closure of normally opened contacts 213-2 of high speed relay 213 which also has a pair of normally closed contacts 213-1 connected in series with relay 180 and normally closed contacts 176-1. Energization of either of latch relays 182 or 183 cannot be made when travel relays 178 or 179 are energized, because of normally closed contacts 178-1 and 179-1. The power circuit to the forward latch relay 182 can be traced from conductor 192 through contacts 179-1, 178-1, 200-1, 212-1, 197-2, 183-2, relay 182, contacts 210-1 and 209-1 to line 186. The power circuit to relay 183 can be traced from contacts 178-1 through contacts 199-2, 212-2 and 182-2.

The lowermost branch circuit of FIG. 7 includes a light 34 positioned to activate the transfer permissive photocell or photodetector 33 on crane 16 and a solenoid 211 provided for actuating switch 48 on the crane. Light 34 is connected across parallel lines 186 and 190 through contacts 197-3 of the aisle-center relay. Power to the solenoid may be applied through normally closed contacts 200-2, contacts 198-1 of the crane-on-transfer relay and contacts 216-1 of DC control relay 216 (FIG. 8).

Referring to FIG. 8, in addition to control relay 216, two other computer control relays 217 and 218 are energized under the command of the computer program to initiate travel of the trolley along the transfer course or initiate travel of the crane off the trolley. To this end, computer contacts 219 are the forward travel command contacts in series with relay 217. Computer contacts 220 connected in series with relay 216 initiate travel of the crane off the transfer unit which occurs upon energization of solenoid 211. Computer contacts 221 in series with relay 218 is the computer command for reverse travel of the trolley. Energization of the transfer trolley is effected upon closure of the computer contacts 222 which connects the DC control relays to the output of the DC rectifier 223. Rectifier 223 is connected across the secondary winding of transformer 224 which has its primary winding connected across AC lines 186 and 190.

The energization circuits for the forward and reverse trolley travel relays 178, 179 and high speed relay are shown in FIG. 8 and includes a manually operable forward travel switch 225 and reverse travel switch 226. Switch 225 when actuated serves to connect control relay 212 across lines 186 and 192 and also establishes the circuit from one side of relay 178 through normally closed contacts 179-2 to line 192. The connection to the other side of relay 178 may be traced through normally closed microswitch 227 (end of transfer trolley course safety switch) and through a series of normally closed contacts including contacts 182-3, 183-3, 199-2 and normally closed limit switch 228 to line 186. Limit switch 228 positioned on the trolley and cammed by the crane is closed so long as the crane is not moving on or off the trolley i.e., switch 228 opens when the crane enters the trolley and closes when the crane is fully in the trolley, and it opens as the crane starts to move off the trolley and closes when the crane leaves the trolley. Should the crane be moving on or off the trolley, switch 228 is opened to prevent energization of relays 178, 179 and 213.

Switch 226 when actuated also connects relay 212 across lines 192 and 186 and establishes the electrical circuit for relay 179 to line 192 through normally closed contacts 178-2. Relay 179 is connected to line 186 through normally closed microswitch 229 and contacts 182-3, 183-3, 191-2 and microswitch 228. Microswitches 227 and 229 are located on the trolley and are overtravel limit switches operated respectively by cams located at opposite ends of the trolley rails as a safety precaution.

In automatic operation, manually operable switches 225 or 226 are bypassed upon closure of contacts 196-2 and energization of the forward travel relay 217 or reverse travel relay 218 in the DC control circuits. Energization of relay 217 closes its contacts 217–1 and 217–2, while energization of relay 218 closes its contacts 218–1 and 218–2 to provide power to control relay 212 travel relay circuits through contact 196–2 of the automatic relay 196. High speed relay 213 is adapted to be energized from line 190 through closure of contacts 197–4 and establishment of the circuit to line 186 through a series of normally closed microswitches 230, 231, 232 or one of the contacts 212–3, 178–4, or 179–4 connected in parallel therewith. Contacts 178–2 and 179–2 interlock relays 178 and 179 to prevent simultaneous energization thereof.

Slow down switch 230 located on the transfer trolley is engageable by cams associated with each aisle and disposed along the transfer trolley course to open its (switch 230) contacts a short distance before the trolley reaches the center position of each aisle. The cam associated with each aisle is a long cam centered with the aisle and extending on opposite sides of the center of the aisle so as to open switch 230 on approach from either side toward the center of the aisle. Although switch 230 always opens as it approaches the center of an aisle, the circuit to the high speed relay 213 is not opened unless contacts 212–3 are open. Contacts 212–3 are closed until the computer, in response to feedback information on the position of the transfer trolley, releases relay 212 when the trolley approaches that aisle to which the crane is to be transferred in accordance with and as selected by the computer program.

Like switches 227 and 229, switches 231 and 232 located on the transfer trolley are overtravel limit switches engageable by cams located at opposite ends of the transfer trolley tracks but "ahead" of the cams which engage limit switches 229 and 227. Thus switches 231 and 232 provide a first line of defense for overtravel, while switches 229 and 227 form a second line of defense. Switches 227 and 232 limit overtravel in one direction, for example the forward direction, while switches 229 and 231 limit overtravel in the opposite direction. Contacts 178–4 and 179–4 when closed shunt limit switches 231 and 232 to permit "back out" from an overtravel position in high speed. It may be noted that many of the microswitches mentioned herein and their operating cams, for example switches 201, 203, 204, 227, 229, 230, 231 and 232, are not shown in FIGS. 1 and 2 to avoid complication and confusion in these figures.

Position of the trolley along the transfer course is automatically determined by actuation of a group normally open microswitches 233–236 located on the trolley and connected to the command center. These switches are collectively shown at 238A and are adapted to be activated in position-identifying combinations by groups 236A of cams disposed along the transfer course each group in position-coded array so that depending on a particular combination set up by the actuated switches, a position information input is provided to the computer. Alternatively or as a check, position feedback may be provided by counting and uncounting in the computer, signals generated as each aisle is passed, for example by means of a microswitch located on the trolley and activated by a cam at each aisle. Other information to the computer relative to crane operation is provided by contacts 197–5 of the aisle center control relay, contacts 198–2 of the crane on transfer troller relay and contacts 196–3 of the automatic relay.

Figure 9:
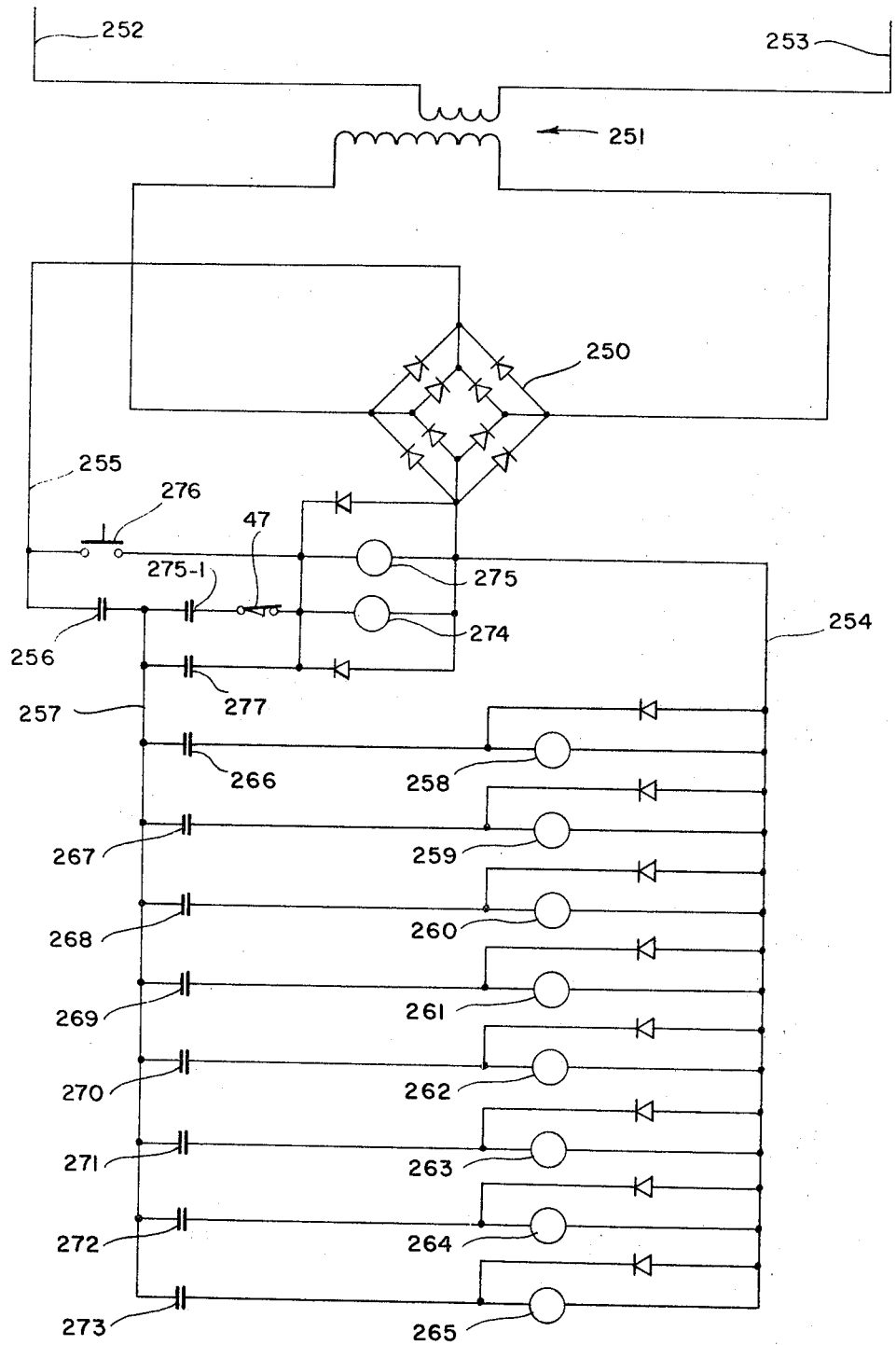
FIGS. 9 and 10 are across-the-line diagrams of the A.C. and D.C. control circuits for the crane.
Figure 10:
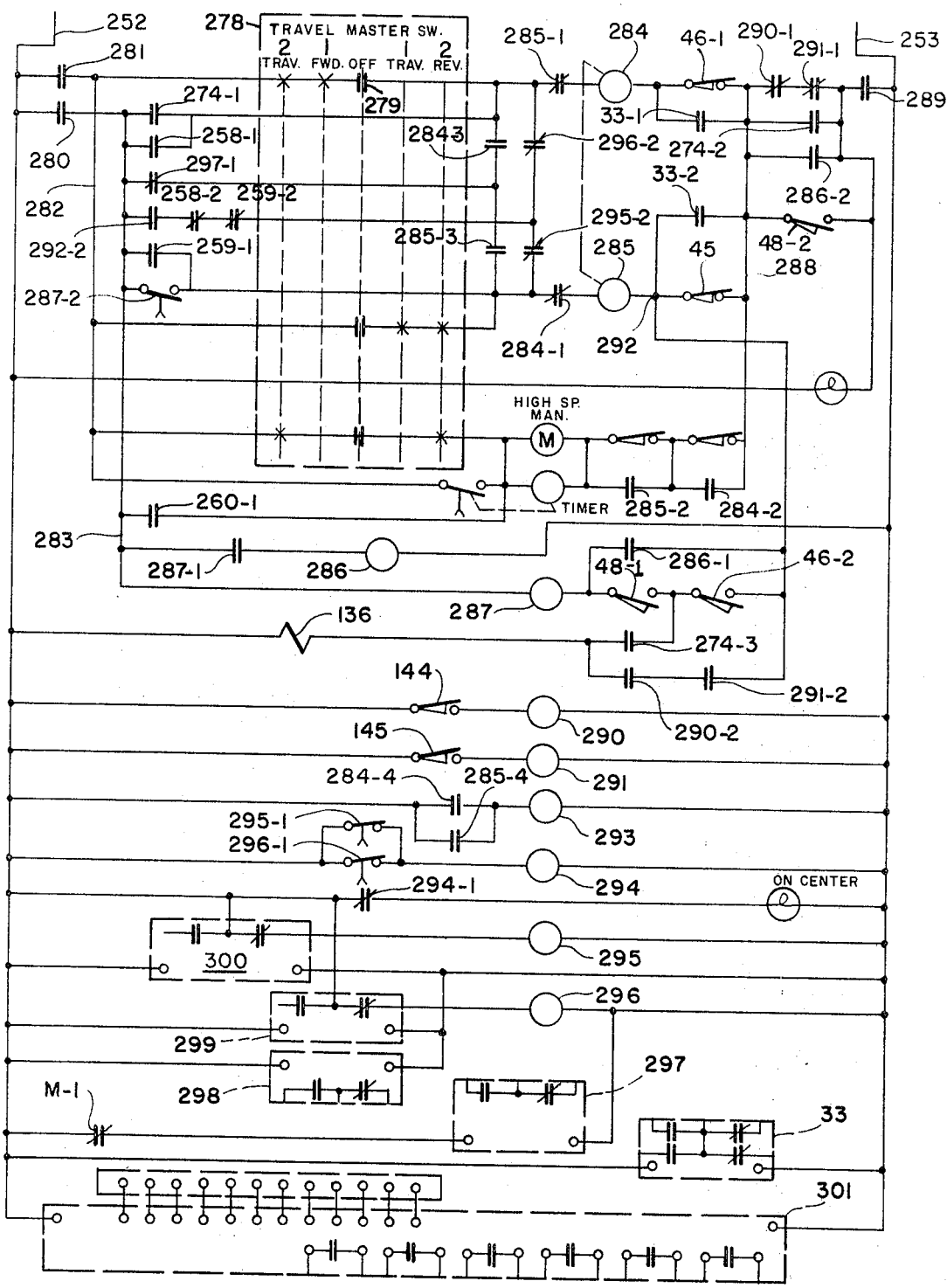

Referring now to FIGS. 9 and 10, the AC and DC crane control circuit will be described. The motor drive for the crane includes the usual reversible AC drive motors, reversible hoist motors for the forks and a drive connection for extending and retracting the forks which are controlled by a number of DC control relays. Power to the DC control relays is applied from rectifier 250 connected to the secondary winding of transformer 251 which has its primary winding connected across lines 252 and 253 of the input power source. The output from rectifier 250 is taken across lines 254 and 255. Output line 255 has serially connected therein a computer output control contact 256 which, when actuated, establishes power on line 257.

Connected across lines 255 and 257 are each of the several control relays including forward travel relay 258, reverse travel relay 259, high speed travel relay 260, hoist relay 261, lower relay 262, forks right relay 263, forks left relay 264 and forks half extended relay 265. Each of the latter relays are connected in series with a set of computer contacts 266–273 which may be programmed to be actuated in a selected manner.

Also energized from the output of rectifier 250 are a pair of memory relays 274 and 275. Relay 275 can be manually energized upon closure of transfer switch 276 or automatically energized with relay 274 through closure of computer contacts 256 and 277. Contacts 275–1 establish a holding circuit for relay 274 through normally closed microswitch 47 on crane 16 when contacts 277 are released. Switch 47 is disposed to be tripped when the crane is nested in the transfer trolley 63.

Referring to FIG. 10, the AC crane operating circuits are energized through power lines 252 and 253 upon closure of contacts 280 which occurs when the crane is switched into automatic operation. Manual control is established upon closure of contacts 281 which applies power to line 282. For manual control, a master travel selector switch 278 is provided having respective first and second TRAVEL FORWARD positions, an OFF position, and first and second TRAVEL REVERSE positions. The symbolic convention for switch arrangement 278 is similar to that heretofore described for switch arrangement 191. For example a set of contacts 279 are closed in the first and second TRAVEL FORWARD positions as indicated by the X marks to the left of contacts 279. The convention is applicable in a similar way to the other sets of contacts of switching arrangement 278. Closure of contacts 280 energizes line 283 to enable energization of forward travel starter 284, reverse travel starter 285, relay 286 and timing relay 287. Contacts 280 and 281 may be manually operable. They are arranged so that only one set can be closed at any given time, for example as by a single-pole double throw switch. Relay 287 is provided with instant-on contacts 287–1 and on-delay (slow to close) contacts 287–2. The travel starters 284 and 286 are suitably connected to control the motor drive 50.

The energization path for starter 284 can be traced from line 283 through normally open contacts 274–1, normally closed contacts 285–1, starter 284, normally closed contacts 46–1 of forward overtravel limit switch 46 or the normally open on-delay (slow to close) contacts 33–1 of photodetector 33 connected in parallel therewith and joined at auxiliary power line 288. Power to line 288 from the main line 253 may be provided through the fork interlock switch 289, when closed, and one of a plurality of conductive paths in series therewith. One path includes normally closed, series connected contacts 290–1 and 291–1 which are actuated when their corresponding relays 290 and 291 are energized. Relays 290 and 291 are connected in series across power lines 252 and 253 with microswitches 144 and 145 mounted on the connector of the quick disconnect mechanism. Microswitches 144 and 145 are the normally closed type, but are held open when connectors 60 and 61 are mated. The other alternate paths include contacts 274–2 of memory relay 274 and contacts 286–1 of timer 286. Switch 289 is closed when the crane forks are in neutral or centered position.

Microswitch 46 is positioned on the crane and is tripped when the crane is at the transfer disconnect position so that starter 284 cannot be energized at this position except by closure of bypass contacts 33–1. To this end, contacts 33–1 are on-delay operating contacts of the photodetector 33 energized when the light source 34 carried on the transfer trolley actuates the photocell circuit. Contacts 33–1 represent a timing relay circuit which is enabled by the light detector 33 in response to light to start timing when line 288 is hot, thus to operate contacts 33–1 after a predetermined time delay. Contacts 33–2 similarly represent a timing delay circuit enabled by the light detector 33.

The energization path of reverse starter 285 can be traced from line 283 through timer on-delay contact 287–2 or relay contacts 259–1, normally closed contacts 284–1 and starter 285 to junction 292. Junction 292 is connected to the auxiliary power line 288 either through normally closed microswitch 45 or a second set of normally open contacts 33–2 of photodetector 33. Microswitch 45 is an overtravel indicator positioned on the crane and operated by a lug on a rack so as to be tripped open when the crane is in the transfer disconnect position. Contacts 33–2 of photodetector bypass the limit switch 45 and permit the crane to get away from the disconnect position when being transferred from the trolley.

Relay 286 is connected in series with normally open contacts 287–1 between power lines 283 and 253. The power circuit for timer 287 is sealed through contacts 286–1 after it is established upon closure of solenoid operated normally open microswitch 48 and normally opened contacts 46–2 of overtravel microswitch 46 electrically connected to junction 292. Contacts 46–2 also form one path for energizing the quick-disconnect solenoids 136 through contacts 274–3 of memory relay 274.

The quick disconnect solenoids may also be energized through a path established through contacts 290–2 and 291–2 of relays 290 and 291. Relays 290 and 291 are connected in series with microswitches 144 and 145 mounted on the detachable connector 61 carried by the crane. When the connector parts are separated as the crane moves from a disconnect position switches 144 and 145 close so that solenoid 136 is energized to maintain the trip arm activated and prevent interference of the trip arm with the locked connector part 60 when the crane is returned and reconnection made.

The balance of the circuit elements shown generally in FIG. 10 include various control relays 293–296 time delay networks 297–300 and photodetector 301 with associated contacts for controlling crane operation, a description of which is not essential to the understanding of the present invention.

Briefly describing the operation of the circuits, when the crane is to be transferred from one aisle to the next in a forward direction, presence of the crane nested on the transfer trolley is signalled to the computer by the crane-on-transfer relay 198. In response, the computer provides a command that results in closure of contacts 222 and 219 to energize travel forward relay 217. Contacts 217–1 and 217–2 close to energize the control relay 212 and transfer trolley forward motion contactor 178. This in turn closes contacts 178–3 to cause high speed relay 213 to be picked up. In the meantime contacts 212–3 have been closed.

The transfer unit is now travelling both in a forward direction and also in its high speed condition. As the trolley approaches the aisle to which the crane is to be transferred in accordance with the computer program, computer contacts 219 open to release relay 217 thereby releasing relay 212 and opening contacts 212–3. Switch 230 is cammed open and relay 213 is released slowing down the trolley.

The trolley is still being driven in the forward direction until the center of the selected aisle is reached, at which time switch 201 is opened and aisle center relay 197 deenergized. Once the trolley arrives at the correct aisle position, information is returned to the computer through closure of contacts 197–5.

The trolley is now at the new aisle position ready to transfer the crane into the selected aisle. Computer contacts 220 are now closed to energize relay 216 which in turn causes energization of solenoid 211. Energization of solenoid 211 trips limit switch 48 which is physically located on the crane to enable the circuits that start the crane travelling in a direction from the trolley transfer unit into an aisle. Closure of switch 48 also serves to energize the quick disconnect solenoid 136 to swing trip bar 137 clear of lip 143 and permit docking or mating of the connector parts.

At this point, contacts 46–2 of microswitch 46 are still closed and remain closed as long as the crane is on the trolley, and closure of switch 48 picks up transfer timing relay 287. Contacts 287 close instantly, and after a given time delay contacts 287–2 are closed. In the meantime, timer 286 has been energized through contacts 287–1 to seal in relay 287 and also close contacts 286–2 which bypass contacts 274–2 and contacts 290–1 and 291–1 which will be opened when the connectors 60 and 61 are mated or docked. Upon closure of the timer contacts 287–2, starter 285 is energized to establish the drive circuits that start the crane off the transfer trolley and into an aisle position.

As the crane begins to move off the trolley switch 45 maintains relay 285 energized. When the crane reaches the correct position, switch 45 is tripped open and relay 285 is deenergized. This also breaks the power circuit to timer 287, which in turn drops out relay 286, and solenoid 136 causing the latch mechanism to lock the connector parts together. It should be noted that at the transfer position, contacts 33–2 shunt switch 45. Since switch 45 is an overtravel limit switch, contacts 33–2 allow a slightly longer energization of relay 285 to permit the crane to move away from the overtravel position.

Travel in a forward direction should be obvious. With the crane in automatic, when the computer command for transfer of the crane is given, contacts 256 and 277 are closed to pick up the memory relay 274. This in turn closes 274–1, but the crane will not be moved unless the transfer trolley is also in the aligned position. This is because microswitch 46 and its corresponding contacts 46–1 are tripped open at the end of the aisle and held open at that position. When the transfer trolley moves into a correct position, light 34 energizes the photodetector 33 which closes contacts 33–1 that shunt microswitch contacts 46–1.

Energization of the memory relay 274 also energizes the quick disconnect solenoid 136 by closure of contacts 274–2, contacts 46–2 being tripped in their closed position when the crane is in the transfer position. As the crane begins to move in a forward direction away from the transfer position, microswitches 144 and 145 are tripped closed upon disengagement of connector parts 60 and 61 to energize relays 290 and 291 and returning contacts 290–1 and 291–1 to their normally closed position. This makes line 288 and junction 292 hot and also seals in the quick disconnect solenoid through contacts 290–2 and 291–2 which are now closed.

Once the solenoids 136 are energized and contact 33–1 closed to shunt microswitch contacts 46–1, the crane travels forward onto the transfer trolley. As the crane leaves the transfer area, limit switch 46 leaves cam 42 thus closing contacts 46–1. The moving crane carries photoswitch 33 out of the angled light beam from light source 34, thus opening contacts 33–1. The crane is stopped on the transfer trolley by opening of contacts 46–1 of the overtravel limit switch 46 upon engagement with cam 43. When the crane is nested on the transfer trolley, microswitch 47 is tripped open to deenergize memory relay 274. The release of memory relay 274 then permits the crane to remain inactive unitl a transfer command is received to transfer the crane off the trolley. The transfer trolley may now be positioned at a selected aisle in the manner hereinbefore described.

It is to be understood that the herein described arrangements are simply illustrative of the principles of the invention and that other embodiments and applications are within the spirit and scope of the invention.

We claim as our invention:

1. In a system having storage means, a transfer vehicle, a second vehicle with means thereon to retrieve and deposit loads from and in said storage means controlled by information transmitted through a control cable linking the second vehicle to command source means and transferable from any one to another of a plurality of defined paths of operation by means of said transfer vehicle which carries the second vehicle along a transfer course extending from the transfer end of said one path to the transfer end of said other path, and wherein the second vehicle includes travel circuit means for controlling the travel of the second vehicle along the paths of operation in prescribed directions, and wherein said transfer vehicle is alignable with the transfer end of each of said paths to allow interchange of the second vehicle between the transfer vehicle and any of said paths:

(a) a control cable for each of said paths, each cable having connector means attached to one end of the cable, the other end of each cable being connected to said command source means, said connector means of each cable being movable in opposite directions along the cable's associated path;
  (b) terminal means carried by the second vehicle, said terminal means being detachably mateable with the connector means of each cable, mating engagement of said terminal means with a connector means of a cable effecting connection between the second vehicle and the command source means, whereby the second vehicle may be controlled by the command source means;
  (c) means for holding the connector means of each cable in mateable position along its associated one of said paths when the connector means is disengaged from said terminal means;
  (d) first control means carried by the second vehicle and having first and second modes of operation, said control means being operable to assume its first mode of operation in response to a command signal via a said cable connected to the second vehicle and to maintain said first mode after disengagement of said terminal means from the connector means of the cable;
  (e) second control means for operating the travel circuit means of said second vehicle to cause the second vehicle to move toward and on the transfer vehicle in response to said first control means being in its first mode and said transfer vehicle being in transfer alignment with the transfer end of that path in which the second vehicle is then disposed;
  (f) means responsive to the reception of the second vehicle by the transfer vehicle from a path for initiating movement of the transfer vehicle along said transfer course from the transfer end of that path to the transfer end of another of said plurality of paths;
  (g) means responsive to the arrival of the transfer vehicle at the transfer end of the selected path for actuating said travel circuit means to cause the second vehicle to move off the transfer vehicle and into said selected path toward the connector means of the cable associated with the path; and
  (h) locking means responsive to the arrival of the second vehicle at the connector means in the selected path after leaving the transfer vehicle for locking said terminal means in mated engagement with that connector means, said locking means having respective cooperative elements located on the connector means and the terminal means respectively.

2. The combination as is claimed in claim 1 wherein said first control means reverts to its second mode in response to the second vehicle nesting in the transfer vehicle.

3. The combination as in claim 1 wherein there is means responsive to said first control means in its first mode for unlocking said terminal means from the connector means with which it is mated.

4. The combination as in claim 1 wherein said means for locking in paragraph (h) comprises a locking arrangement which in a first state is operable to lock said terminal means in mated engagement with a said connector means and in a second state is operable to unlock the terminal means from said connector means with which it is mated, said locking arrangement being operable to its second state in response to the first mode of said first control means.

5. The combination as in claim 4 wherein, said locking arrangement comprises a solenoid adapted to be energized in response to the first mode of said control means, and a latch which in a first state is operable to lock said terminal means in mated engagement with said connector means and in a second state is operable to unlock the terminal means from said connector meas, said latch assuming its second state when the solenoid is energized and its first state when the solenoid is deenergized.

6. A system as set forth in claim 1 wherein said means for holding the connector means comprises a releasable locking means positioned in each path to effect separation of said connector means from said terminal means when said second vehicle is transferred onto the transfer vehicle.

7. A system as set forth in claim 6 wherein said means for holding each cable comprises an overhead rail, said connector means includes a support arm positionable along said rail, said releasable locking means having a pivotal stop member and means for biasing said stop member for engagement with said support arm such that said connector means of each cable is adapted to be locked in place at said corresponding location to prevent movement of the disengaged connector means along said rail.

8. A system as set forth in claim 7 wherein said support arm is adapted to engage said stop member and overcome the force of said biasing means when said connector means and terminal means are mated and said second vehicle is driven into a path of operation.

9. A system as set forth in claim 1 wherein said second control means comprises a light source on said transfer vehicle and light responsive means on said second vehicle and operable in response to alignment with said light source to effect a circuit operation.

10. A system as set forth in claim 9 wherein the travel circuit means of the second vehicle includes a switch carried on said second vehicle and adapted for actuation from a first position to a second position when said second vehicle approaches the transfer end of a path, said switch including a first pair of contacts that are normally closed in said first switch position and are adapted to open when said switch is actuated to its second position for deenergization of said travel circuit means, and wherein said light responsive means is arranged to effect a shunt across said first pair of contacts to permit movement of said second vehicle onto the transfer vehicle only when said transfer vehicle is in transfer alignment.

11. A system as set forth in claim 10 wherein said switch includes a second pair of normally open contacts adapted to be closed when said switch is actuated to its second position, said second pair of contacts being connected in circuit with said solenoid to prevent energization of the solenoid while said first pair of contacts are closed.

12. A system as set forth in claim 1 wherein said means responsive to the arrival of the transfer vehicle at the transfer end of a selected path comprises first means on the transfer vehicle arranged to be energized upon said arrival of the transfer vehicle and second means on said second vehicle disposed to be actuated in response to energization of said first means, said second means being connected in the travel circuit means of said second vehicle for actuating the travel circuit means.

13. A system as set forth in claim 1 wherein the means for supporting the connector means of each cable includes support means disposed along the associated path, locking means carried by the support means, said locking means being operable to lock the connector means to said support means when the connector means is disengaged from said terminal means and unlock the connector means from the support means in response to engagement of the connector means with said terminal means to permit movement of the control cable having a mated connector means and terminal means along its associated path.

14. The combination as in claim 1 wherein said storage means comprises a plurality of storage racks spaced apart to provide paths of operation therebetween, and said second vehicle is a stacker crane which under command of said command source means is operable to store and retrieve articles to and from said racks.

15. In a system having storage means, a motor driven transfer vehicle, a motor driven second vehicle with means thereon to deposit and retrieve loads to and from said storage means and controlled by information transmitted through a control cable linking the second vehicle to command source means and transferable from one to another of a plurality of defined paths of operation by means of said transfer vehicle which carries the first vehicle along a transfer course extending from the transfer end of said one path to the transfer end of another of said paths, and wherein said transfer vehicle is alignable with the transfer end of each of said paths to allow interchange of the second vehicle from the path in which it is disposed to the transfer vehicle and then to a selected one of the plurality of paths:
 (a) a control cable corresponding to each of said paths, each cable having connector means attached to one end of the cable, the other end of each cable being connected to said command source means, means for supporting each cable for movement along its associated path;
 (b) terminal means carried by the second vehicle, said terminal means adapted to be mated with the connector means of each cable whereby mating engagement of said terminal means with a connector means of a cable effects connection of the second vehicle to the command source means;
 (c) locking means operable in a first state to lock said terminal means in mated engagement with a connector means and in a second state to effect unlocking of said terminal means from said connector means with which it is mated;
 (d) means for causing said locking means to assume its first state in response to the application of a force tending to cause mating of said terminal means and connector means;
 (e) means for causing said locking means to assume its second state in response to the application of a force tending to separate said terminal means and connector means; and
 (f) means for holding the connector means of each cable in mateable position along its associated one of said paths when the connector means is disengaged from said terminal means.

16. The combination in claim 15 wherein said storage means comprises a plurality of storage racks spaced apart to provide paths of operation therebetween, and said second vehicle is a stacker crane which under command of said command source means is operable to store and retrieve articles to and from said racks.

17. A storage system comprising article storage means, a power driven vehicle with article handling means mounted thereon for depositing and removing articles in and from said storage means, means to transfer said power driven vehicle between selected locations in said storage means, a command source, a control cable located in at least one of said selected locations and having one end connected to said command source and the other end being adapted to be connected to said power driven vehicle for controlling said vehicle and article handling means from said command source, a control cable disconnect mechanism including a connector having a male part and a female part, one of said parts being attached to said other end of the control cable and adapted to be releasably supported at a first fixed location, the other of said parts being mounted to the vehicle for mating engagement with said one part when said vehicle is driven in one direction to said first location from a second location where said other part is away from said one part, and latching means mounted on one of said parts and engageable with the other of said parts for locking said parts in mating engagement for movement with said power driven vehicle, said latching means being operable in response to the movement of said vehicle toward said second location in a reverse direction relative to said one direction to release said parts when said parts are at said first location.

18. In a system comprising storage means with a plurality of paths therebetween, a vehicle having article handling means and operable in said paths to remove and deposit articles from and in said storage means, and means for transferring said vehicle between said paths, and a command source, the combination therewith of apparatus for effecting connection of said vehicle to said command source comprising: a control cable located in each of said paths and having one end connected to said command source and the other end adapted to be connected to said first vehicle for controlling the latter from said command source during an article handling cycle, means for supporting each control cable for movement along its associated path, a cable end connector part connected to said other end of each control cable, a vehicle connector part carried by the vehicle ad mateable with each of said cable end connector parts, said vehicle connector part having means for operably connecting said vehicle to the command source through the connector parts when in their mated condition, means for locking the mated connector parts such that the control cable connected to the vehicle is movable with the vehicle as it is operated in a path, and means at a position in each of said paths for releasably locking to said supporting means the cable end connector part associated with the cable in the path to prevent movement of the control cable when its cable end connector part is not engaged with the vehicle connector part.

19. The combination as in claim 18 wherein said storage means comprises storage racks separated by aisles, said aisles defining said paths.

References Cited

UNITED STATES PATENTS

| 3,294,260 | 12/1966 | Frangos | 214—16.1 |
| 3,432,046 | 3/1969 | Krusinski | 214—16.4 |
| 3,445,009 | 5/1969 | Burch | 214—16.4 |

FOREIGN PATENTS 1,317,152  12/1962  France.

GERALD M. FORLENZA, Primary Examiner

R. B. JOHNSON, Assistant Examiner

U.S. Cl. X.R.

214—88